United States Patent
Luo et al.

(12) 
(10) Patent No.: US 6,201,080 B1
(45) Date of Patent: Mar. 13, 2001

(54) PREPARATION OF SYNDIOTACTIC 1, 2-POLYBUTADIENE USING A CHROMIUM-CONTAINING CATALYST SYSTEM

(75) Inventors: Steven X. L. Luo; Yoichi F. Ozawa, both of Akron; James E. Hall, Mogadore, all of OH (US); Jung W. Kang, Honolulu, HI (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 08/996,656

(22) Filed: Dec. 23, 1997

(51) Int. Cl.$^7$ .............................. C08F 4/69; C08F 136/06
(52) U.S. Cl. ....................... 526/139; 526/151; 526/169.1; 526/335; 525/914
(58) Field of Search ................................... 526/139, 335, 526/169.1, 151; 525/914

(56) References Cited

U.S. PATENT DOCUMENTS

| | | |
|---|---|---|
| 3,778,424 | 12/1973 | Sugiura et al. . |
| 3,879,367 | * 4/1975 | Halasa et al. .................... 526/139 X |
| 4,168,357 | 9/1979 | Throckmorton et al. ............ 526/139 |
| 4,168,374 | 9/1979 | Throckmorton et al. ............ 526/139 |
| 4,182,813 | 1/1980 | Makino et al. ........................ 526/92 |
| 4,751,275 | 6/1988 | Witte et al. ......................... 526/139 |
| 5,677,400 | * 10/1997 | Tsujimoto et al. ............... 526/139 X |

FOREIGN PATENT DOCUMENTS 48-6939 3/1973 (JP) .
48-64178 9/1973 (JP) .

OTHER PUBLICATIONS

Hidetomo Ashitaka, Hideo Ishikawa, Haruo Ueno, and Akira Nagasaka, Syndiotactic 1, 2–Polybutadiene With Co–CS$_2$ Catalyst System. I. Preparation, Properties, and Application of Highly Crystalline Syndiotactic 1, 2–Polybutadiene, Journal of Polymer Science: Polymer Chemistry Edition, vol. 21, 1853–1860 (1983).

J. Boor, Jr., Ziegler–Natta Catalysts and Polymerization, Academic Press: New York, 1979, p. 144.

* cited by examiner

*Primary Examiner*—Fred Teskin
(74) *Attorney, Agent, or Firm*—David G. Burleson; Frank J. Troy, Sr.; Aaron B. Retzer

(57) ABSTRACT

The instant invention teaches a method for forming a syndiotactic 1,2-polybutadiene product having a syndiotacticity of more than 66.5% and a melting temperature of more than about 100° C. The method includes polymerizing 1,3-butadiene in solution with a solvent, in the presence of catalytically effective amounts of: (a) an organomagnesium compound; (b) a chromium compound; and, (c) a dihydrocarbyl hydrogen phosphite. The present invention also contemplates a product of the method and an article made from the product.

12 Claims, No Drawings

PREPARATION OF SYNDIOTACTIC 1, 2-POLYBUTADIENE USING A CHROMIUM-CONTAINING CATALYST SYSTEM

FIELD OF THE INVENTION

This invention relates to a catalyst system for the production of syndiotactic 1,2-polybutadiene.

BACKGROUND OF THE INVENTION

Pure syndiotactic 1,2-polybutadiene (SPB) is a thermoplastic resin which has double bonds attached in an alternating fashion to its polymeric backbone. Films, fibers and molded articles can be made utilizing syndiotactic 1,2-polybutadiene. It can also be blended into rubbers and cocured therewith. Syndiotactic 1,2-polybutadiene can be made by solution, emulsion or suspension polymerization. It typically has a melting point which is within the range of about 195° C. to about 215° C. Many transition metal catalyst systems based on titanium, vanadium, chromiumm, molybdenum, palladium, iron and cobalt have been reported in the prior art for the preparation of syndiotactic 1,2-polybutadiene (see, i.e., J. Boor, Jr., Ziegler-Natta Catalysts and Polymerizations, Academic Press: New York, 1979, P. 144). However, the majority of these catalyst systems have no industrial application because they have insufficient polymerization activity and stereoselectivity and in some case produce low molecular weight polymers or cross-linked polymers unsuitable for commercial use. The following cobalt-containing catalyst systems have been widely known for the preparation of syndiotactic 1,2-polybutadiene:

I. Cobalt dibromide/triusobutyl aluminum/water/triphenyl phosphine disclosed in U.S. Pat. No. 4,182,813, assigned to Japan Synthetic Rubber Co. Ltd.; and, II. Cobalt tris(acetylacetonate)/triethyl aluminum/water/carbon disulfide disclosed in U.S. Pat. No. 3,778,424, assigned to Ube Industries Ltd.

These two catalyst systems also have serious disadvantages. The cobalt dibromide/triisobutyl aluminum/water/triphenyl phosphine system yields syndiotactic 1,2-polybutadiene having low crystallinity. In addition, this catalyst system develops sufficient catalytic activity only in halogenated hydrocarbon solvents as polymerization medium, and halogenated solvents present the problems of toxicity. The second catalyst system uses carbon disulfide as one of the catalyst components, thereby necessitating the use of special safety measures due to its high volatility, low flash point as well as toxicity. Accordingly, many restrictions are required for the industrial utilization of the said catalyst system. Furthermore, the syndiotactic 1,2-polybutadiene produced with this catalyst system has a very high melting point (200° C. to 210° C.) and is therefore difficult to process.

Coordination catalysts based on chromium compounds such as triethylaluminium/chromium tris(acetylacetonate) have a low activity and have not been usable on a technical scale. JP-A-7306939 and JP-A-7364178, both assigned to Mitsubishi, disclose a process for polymerization of 1,3-butadiene to amorphous 1,2-polybutadiene by using a ternary catalyst system comprising (A) a soluble chromium compound, (B) a trialky aluminum compound, and (C) a dialkyl hydrogen phosphite. The product was reported to be a white rubbery polymer containing a portion of gel and displaying no obvious melting point.

U.S. Pat. No. 4,751,275, assigned to Bayer, discloses a process for the preparation of SPB by the solution polymerization of 1,3-butadiene in a hydrocarbon polymerization medium, such as benzene, toluene, cyclohexane, or n-hexane. The catalyst system used in this solution polymerization contains a chromium-III compound which is soluble in hydrocarbons, a trialkylaluminum compound, and di-neopentylphosphite or neopentylmethylphosphite. However, the polymerization product was not well characterized as neither the melting temperature nor the degree of syndiotacticity is reported.

U.S. Pat. No. 4,168,357 and U.S. Pat. No. 4,168,374, assigned to Goodyear, describe chromium-containing catalysts for the preparation of high cis-1,4-polypentadiene.

Notwithstanding the foregoing prior art, it would be advantageous to produce a new and improved catalyst system that can be used to produce a syndiotactic 1,2-polybutadiene product having a higher melting point and increased syndiotacticity compared to the syndiotactic 1,2-polybutadiene produced by the processes of the prior art.

The object of this invention is to overcome the disadvantages of the prior art and provide a new and improved catalyst system for the production of syndiotactic 1,2-polybutadiene having a higher melting point and increased syndiotacticity over syndiotactic 1,2-polybutadiene products of the prior art.

SUMMARY OF THE INVENTION

The instant invention relates to a method for forming a syndiotactic 1,2-polybutadiene product having a syndiotacticity of more than 66.5% prefererably more than 70% and a melting temperature of more than about 100° C., preferably than about 140°. The method includes polymerizing 1,3-butadiene, in the presence of catalytically effective amounts of: (a) an organomagnesium compound; (b) a chromium compound; and, (c) a dihydrocarbyl hydrogen phosphite. The present invention also contemplates a product of the method and an article made from the product.

DETAILED DESCRIPTION OF THE INVENTION

The present invention teaches a process for producing syndiotactic 1,2-polybutadiene by polymerizing 1,3-butadiene with a catalyst system comprising: (a) a hydrocarbon-soluble chromium compound, (b) an organomagnesium compound, and (c) a dihydrocarbyl hydrogen phosphite.

The chromium compound employed in the catalyst system of the instant invention is soluble in a hydrocarbon solvent such as aromatic hydrocarbons, aliphatic hydrocarbons or cycloaliphatic hydrocarbons and includes, but is not limited to, chromium carboxylates such as chromium 2-ethylhexanoate, chromium neodecanoate, chromium naphthenate, chromium stearate, chromium oleate, and chromium benzoate; chromium β-diketonates such as chromium tris(acetylacetonate), chromium tris(trifluoroacetylacetonate), chromium tris(hexafluoroacetylacetonate), chromium tris(benzoylacetonate), and chromium tris(2,2,6,6-tetramethyl-3,5-heptanedionate); chromium alkoxides or aryloxides such as chromium ethoxide, chromium isopropoxide, chromium 2-ethylhexoxide, chromium phenoxide, chromium nonylphenoxide, and chromium naphthoxide; and organo-chromium compounds such as tris(allyl)chromium, tris(methallyl)chromium, tris(crotyl)chromium, bis(cyclopentadienyl)chromium (also called chromocene), bis(pentamethylcyclopentadienyl)chromium (also called decamethylchromocene), bis(benzene)chromium, bis(ethylbenzene)chromium, and bis(mesitylene)chromium.

The organomagnesium compound employed in the catalyst system of the instant invention is a dihydrocarbyl magnesium compound or a hydrocarbon soluble Grignard reagent. The dihydrocarbyl magnesium compound is represented by the formula MgR$_2$, where each R, which may be the same or different, is for example, an alkyl, cycloalkyl, aryl, aralkyl, or allyl group; each group preferably containing from 1 or the appropriate minimum carbon atoms to form such group up to 20 carbon atoms. Examples of such dihydrocarbyl magnesium compounds are diethyl magnesium, di-n-propyl magnesium, diisopropyl magnesium, dibutyl magnesium, dihexyl magnesium, diphenyl magnesium, and dibenzyl magnesium. Preferably, the organomagnesium compound is soluble in hydrocarbon polymerization medium. Dibutyl magnesium is particularly preferred on the grounds of availability and solubility. The hydrocarbon soluble Grignard reagent is represented by the formula RMgX where R is a hydrocarbyl group such as exemplified above and X is fluorine, chlorine, bromine or iodine. Included but not limited to this group of RMgX catalyst components are: ethylmagnesium bromide, butylmagnesium bromide, phenylmagnesium bromide, methylmagnesium chloride, butylmagnesium chloride, ethylmagnesium iodide, phenylmagnesium iodide and the like.

The dihydrocarbyl hydrogen phosphites employed in the catalyst system of the present invention may be represented by the following keto-enol tautomeric structures:

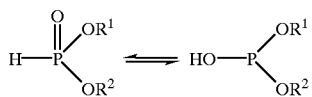

where R$^1$ and R$^2$ are alkyl, cycloalkyl, aryl, aralkyl, or allyl groups which may or may not be identical, each group preferably containing from 1 or the appropriate minimum carbon atoms to form each group up to 20 carbon atoms. The dihydrocarbyl hydrogen phosphites exist mainly as the keto tautomer (shown on the left), with the enol tautomer (shown on the right) being the minor species. Both tautomers may be self associated in dimeric or trimeric forms by hydrogen bonding.

The dihydrocarbyl phosphites may be exemplified by dimethyl hydrogen phosphite, diethyl hydrogen phosphite, dibutyl hydrogen phosphite, dihexyl hydrogen phosphite, dioctyl hydrogen phosphite, didecyl hydrogen phosphite, didodecyl hydrogen phosphite, dioctadecyl hydrogen phosphite, diisopropyl hydrogen phosphite, di-tert-butyl hydrogen phosphite, bis(2-ethylhexyl) hydrogen phosphite, dineopentyl hydrogen phosphite, bis(cyclopropylmethyl) hydrogen phosphite, bis(cyclobutylmethyl) hydrogen phosphite, bis(cyclopentylmethyl) hydrogen phosphite, bis(cyclohexylmethyl) hydrogen phosphite, dicyclobutyl hydrogen phosphite, dicyclopentyl hydrogen phosphite, dicyclohexyl hydrogen phosphite, dimenthyl hydrogen phosphite, diphenyl hydrogen phosphite, dinaphthyl hydrogen phosphite, dibenzyl hydrogen phosphite, bis(1-naphthylmethyl) hydrogen phosphite, ethyl butyl hydrogen phosphite, methyl hexyl hydrogen phosphite, methyl neopentyly hydrogen phosphite, methyl phenyl hydrogen phosphite, methyl cyclohexyl hydrogen phosphite, and methyl benzyl hydrogen phosphite The catalyst according to the present invention may be formed in situ by adding the catalyst components to the monomer/solvent mixture in either a stepwise or simultaneous manner. The sequence in which the components are added in a stepwise manner is immaterial but the components are preferably added in the sequence of organomagnesium compound, chromium compound, and finally dihydrocarbyl hydrogen phosphite. The catalyst may also be preformed by premixing the components outside the polymerization system and the resulting premixed catalyst added to the polymerization system.

The catalyst system of the present invention has polymerization activity over a wide range of total catalyst concentrations and catalyst component ratios. The catalyst components apparently interact to form the active catalyst species. As a result, the optimum concentration for any one catalyst component is dependent upon the concentrations of the other catalyst components. While polymerization will occur over a wide range of catalyst concentrations and ratios, the polymers having the most desirable properties are obtained within a narrower range.

The molar ratio of the organomagnesium compound to the chromium compound (Mg/Cr) can be varied from about 2:1 to about 50:1. However, a preferred range of Mg/Cr molar ratio is from about 3:1 to about 20:1. The molar ratio of the dihydrocarbyl hydrogen phosphite to the chromium compound (P/Cr) can be varied from about 0.5:1 to about 25:1, with a preferred range of P/Cr molar ratio being from about 1:1 to 10:1.

When a catalyst solution is prepared apart from the polymerization, the organic solvent usable for the catalyst component solution may be selected from aromatic hydrocarbons, aliphatic hydrocarbons and cycloaliphatic hydrocarbons, and mixtures of two or more of the above-mentioned compounds. Preferably, the organic solvent consists of at least one selected from benzene, toluene, xylene, n-hexane, n-heptane and cyclohexane.

The total catalyst concentration in the polymerization mass depends on such factors as purity of the components, polymerization rate and conversion desired, and the polymerization temperature. Therefore, specific total catalyst concentrations cannot be definatively set forth except to say that catalytically effective amounts of the respective catalyst components should be used. Generally, the amount of the chromium compound used can be varied from 0.01 to 2 mmol per 100 grams of 1,3-butadiene, with a preferred range being from 0.05 to 1.0 mmol per 100 grams of 1,3-butadiene. Certain specific total catalyst concentrations and catalyst component ratios which produce polymers having desired properties are illustrated in the examples of the present invention.

In performing the polymerization, a molecular weight regulator may be employed to expand the scope of the polymerization system in such a manner that it can be used for the synthesis of syndiotactic 1,2-polybutadiene ranging from an extremely high molecular weight polymer to a low molecular weight polymer. Representative examples of such a molecular weight regulator are accumulated diolefins, such as allene and 1,2-butadiene, and nonconjugated diolefins such as 1,5-cyclooctadiene, 4-vinylcyclohexene, 1,4-pentadiene, 1,5-hexadiene, and 1,6-heptadiene. The amount of the molecular weight regulator used, expressed in parts per hundred by weight of the monomer (phm) 1,3-butadiene employed in the polymerization, is in the range of 0.01 to 1 phm and preferably in the range of 0.05 to 0.5 phm.

The polymerizations of this invention are usually carried out in inert organic solvents. Examples of such solvents are aliphatic, cycloalipatic, and aromatic hydrocarbons. The preferred solvents are hexane, pentane, cyclohexane, methylcyclopentane, benzene, and toluene. Commercial mixtures of the above hydrocarbons may also be used. It will normally be desirable to select a solvent which is inert with respect to the catalyst system employed to initiate the polymerization reaction.

In the practice of this invention, a solution polymerization system may be employed in which the monomer 1,3-butadiene to be polymerized and the polymer formed are soluble in the polymerization medium. Alternatively, a precipitation polymerization system may be employed by choosing a solvent in which the polymer formed is insoluble. In both cases, an amount of the organic solvent in addition to the organic solvent contained in the catalyst component solutions is added to the polymerization system. The additional organic solvent may be either the same as or different from the organic solvent contained in the catalyst component solutions. The concentration of the monomer 1,3-butadiene to be polymerized is not limited to a special range. However, generally, it is preferable that the concentration of the 1,3-butadiene in the polymerization reaction mixture be in a range of from 3 to 80% by weight, but a more preferred range is from about 5% to about 50% by weight, and the most preferred range is from about 10% to about 30% by weight.

The polymerization process of the present invention may be carried out in either a continuous manner or in a batch-wise manner, both employing moderate to vigorous agitation. The polymerization is conducted under anaerobic conditions using in inert protective gas such as nitrogen, argon or helium. The polymerization temperature employed in the practice of this invention may vary widely from a low temperature, such as –10° C. or below, to a high temperature such as 100° C. or above, with a preferred temperature range from about 20° C. to 90° C. The heat of polymerization may be removed by external cooling, cooling by evaporation of the monomer 1,3-butadiene or the solvent, or a combination of the two methods. Although the polymerization pressure employed in the practice of this invention may vary widely, a preferred pressure range is from about 1 atmosphere to about 10 atmospheres.

The polymerization reaction, on reaching the desired degree of polymerization, can be stopped by the addition of a known polymerization terminator into the reaction system to inactivate the catalyst system, followed by the conventional steps of desolventization and drying as are typically employed and are known to those skilled in the art in the production of conjugated diene polymers. Typically, the terminator employed to inactivate the catalyst system is a protic compound such as an alcohol, a carboxylic acid, an inorganic acid, and water or a combination thereof An antioxidant such as 2,6-di-tert-butyl-4-methylphenol may be added along with, before or after addition of the terminator. The amount of the antioxidant employed is usually in the range of 0.2% to 1% by weight of the polymer product. When the polymerization reaction has been stopped, the syndiotactic 1,2-polybutadiene product may be isolated from the polymerization mixture by precipitation with an alcohol such as methanol, ethanol, or isopropanol or by steam distilllation of the solvent and unreacted monomer, followed by filtration. The product is then dried under a constant vacuum at a temperature of about 25° C. to about 100° C. (preferably at about 60° C.).

Syndiotactic 1,2-polybutadiene has many uses. Syndiotactic 1,2-polybutadiene can be incorporated into synthetic elastomers in order to improve the green strength of elastomers particularly in tires. The supporting carcass (reinforcing carcass) of tires is particularly prone to distortion during tire building and curing procedures. For this reason the incorporation of syndiotactic 1,2-polybutadiene into elastomers which are used as the supporting carcass for tires has particular utility. Syndiotactic 1,2-polybutadiene is also useful in the manufacture of food films and in many molding applications.

The following examples are submitted for the purpose of further illustrating the nature of the present invention and should not be regarded as a limitation on the scope thereof. Parts and percentages shown in the examples are by weight unless otherwise indicated.

EXAMPLE 1

An oven dried one liter glass bottle was capped with a self-sealing rubber liner and a perforated metal cap and purged with a stream of nitrogen. The bottle was charged with 200 grams of a 25% by weight of 1,3-butadiene in hexane blend (25/75 w/w) and 255 grams of additional hexane. The following catalyst components were added to the bottle in the following order: 0.45 mmol of $MgBu_2$; 0.050 mmol of chromium 2-ethylhexanoate, and 0.25 mmol of bis(2-ethylhexyl) hydrogen phosphite. The bottle was tumbled for 4 hours in a water bath maintained at 50° C. The polymerization was terminated by addition of 10 ml of isopropanol containing 0.5 g of 2,6-di-t-butyl-4-methylphenol. The polymerization mixture was added into 3 liters of isopropanol. The polymer was isolated by filtration and dried to a constant weight under vacuum at 60° C. The yield was 32.5 grams (65%). The syndiotacticity of the recovered 1,2-polybutadiene was confirmed by the results of analysis by differential scanning calorimetry (DSC) and nuclear magnetic resonance (No). As measured by DSC, the 1,2-polybutadiene had a melting point of 144° C. NMR analysis of the polymer indicated a 1,2-microstructure content of 86.2%, and a syndiotacticity of 70.8%. As determined by gel permeation chromatography, the polymer has a weight average molecular weight ($M_w$) of 997,000, a number average molecular weight ($M_n$) of 490,000, and a polydispersity index ($M_w/M_n$) of 2.0. The monomer charge, amounts of catalysts and the properties of the resultant syndiotactic 1,2-polybutadiene are summarized in Table I.

TABLE I

| Example No. | 1 | 2 | 3 | 4 | 5 | 6 |
|---|---|---|---|---|---|---|
| 1,3-Bd/hexanes (25/75 w/w) (g) | 201 | 200 | 200 | 201 | 201 | 202 |
| Hexanes (g) | 260 | 257 | 260 | 255 | 255 | 252 |
| MgBu$_2$ (mmol) | 0.45 | 0.40 | 0.35 | 0.30 | 0.40 | 0.50 |
| Cr 2-EHA (mmol) | 0.050 | 0.050 | 0.050 | 0.050 | 0.050 | 0.050 |
| HP(O)(OCH$_2$CH(Et)(CH$_2$)$_3$CH$_3$)$_2$ (mmol) | 0.25 | 0.25 | 0.15 | 0 | 0 | 0 |
| HP(O)(OCH$_2$CMe$_3$)$_2$ (mmol) | 0 | 0 | 0 | 0.15 | 0.25 | 0.35 |
| Polymer yield (%) after 4 hours at 50° C. | 65 | 54 | 51 | 71 | 77 | 71 |
| Melting point (° C.) | 144 | 146 | 149 | 143 | 144 | 144 |
| % 1,2-Vinyl | 86.2 | 83.5 | 84.7 | 82.8 | 84.6 | 82.6 |
| Syndiotacticity (%)* | 70.8 | 72.0 | 72.1 | 74.3 | 73.4 | 74.7 |
| M$_w$ | 997,000 | 1,054,000 | 509,000 | 889,000 | 992,000 | 791,000 |
| M$_n$ | 490,000 | 499,000 | 282,000 | 588,000 | 648,000 | 473,000 |
| M$_w$/M$_n$ | 2.0 | 2.1 | 1.8 | 1.5 | 1.5 | 1.7 |

*Expressed in the racemic triad of the vinyl groups and excluding those adjacent to a monomer unit having a 1,4 microstructure.

EXAMPLES 2–3

In Examples 2 and 3, the procedure in Example 1 was repeated having the monomer and the catalyst ratio as shown in Table I. The monomer charge, amounts of catalysts and the properties of the resultant syndiotactic 1,2-polybutadiene produced in each example are summarized in Table I.

EXAMPLES 4–6

In Examples 4, 5 and 6 the procedure in Example I was repeated except that dineopentyl hydrogen phosphite was substituted for bis(2-ethylhexyl) hydrogen phosphite, having the monomer and the catalyst ratio varied as shown in Table I. The monomer charge, amounts of catalysts and the properties of the resultant syndiotactic 1,2-polybutadiene produced in each example are summarized in Table I.

COMPARATIVE EXAMPLES 7 and 8

In Comparative Examples 7 and 8, the procedure in Example 1 was repeated except that triethyl aluminum was substituted for dibutyl magnesium, and the monomer charge and the amounts of catalysts were varied as shown in Table II. The properties of the resultant syndiotactic 1,2-polybutadiene produced in each example are summarized in Table II.

COMPARATIVE EXAMPLES 9 and 10

In Comparative Examples 9 and 10, the procedure in Example 1 was repeated except that triethyl aluminum was substituted for dibutyl magnesium, dineopentyl hydrogen phosphite was substituted for bis(2-ethylhexyl) hydrogen phosphite, and the monomer charge and the amounts of catalysts were varied as shown in Table II. The properties of the resultant syndiotactic 1,2-polybutadiene produced in each example are summarized in Table II.

Comparison of the analytical data of the products obtained in Examples 1–6 with the analytical data of the products obtained in Comparative Examples 7–10 indicates that the catalyst system of the present invention produces syndiotactic 1,2-polybutadiene of higher quality as shown by the significantly higher melting temperature and higher syndiotacticity than was obtained with the chromium-containing catalyst systems disclosed in the prior art.

EXAMPLES 11–16

In Examples 11 to 16, a series of polymerizations were carried out to evaluate 1,2-butadiene as a molecular weight regulator. The procedure is essentially identical to that described in Example 1 except that various amounts of 1,2-butadiene were added to a polymerization bottle containing the monomer solution before addition of the catalyst components. The monomer charge, amounts of catalysts and the properties of the resultant syndiotactic 1,2-polybutadiene produced in each example are summarized in Table III.

TABLE II

| | Comparative Example No. | | | |
|---|---|---|---|---|
| | 7 | 8 | 9 | 10 |
| 1,3-Bd/hexanes (25/75 w/w) (g) | 200 | 200 | 200 | 201 |
| Hexanes (g) | 259 | 260 | 260 | 255 |
| AlEt$_3$ (mmol) | 0.20 | 0.30 | 0.50 | 0.75 |
| Cr 2-EHA (mmol) | 0.050 | 0.050 | 0.050 | 0.050 |
| HP(O)(OCH$_2$CH(Et)(CH$_2$)$_3$CH$_3$)$_2$ (mmol) | 0.20 | 0.20 | 0 | 0 |
| HP(O)(OCH$_2$CMe$_3$)$_2$ (mmol) | 0 | 0 | 0.33 | 0.33 |
| Polymer yield (%) after 4 hours at 50° C. | 70 | 92 | 97 | 96 |
| Melting point (° C.) | 79 | 78 | 100 | 97 |
| % 1,2-Vinyl | 80.1 | 80.0 | 83.1 | 81.1 |
| Syndiotacticity (%) | 57.0 | 57.2 | 64.0 | 66.5 |
| M$_w$ | 1,080,000 | 867,000 | 785,000 | 947,000 |
| M$_N$ | 481,000 | 273,000 | 272,000 | 658,000 |
| M$_w$/M$_n$ | 2.2 | 3.1 | 2.8 | 1.4 |

TABLE III

| Example No. | 11 | 12 | 13 | 14 | 15 | 16 |
|---|---|---|---|---|---|---|
| 1,3-Bd/hexanes (25/75 w/w) (g) | 201 | 200 | 200 | 201 | 201 | 201 |
| 1,2-Bd (phm) | 0.05 | 0.10 | 0.15 | 0.20 | 0.25 | 0.30 |
| MgBu$_2$ (mmol) | 0.45 | 0.45 | 0.45 | 0.45 | 0.45 | 0.45 |
| Cr 2-EHA (mmol) | 0.050 | 0.050 | 0.050 | 0.050 | 0.050 | 0.050 |
| HP(O)(OCH$_2$CH(Et)(CH$_2$)$_3$CH$_3$)$_2$ (mmol) | 0.25 | 0.25 | 0.25 | 0.25 | 0.25 | 0.25 |
| Polymer yield (%) after 4 hours at 50° C. | 46 | 40 | 35 | 31 | 26 | 23 |
| Melting point (° C.) | 147 | 149 | 147 | 149 | 149 | 149 |
| % 1,2-Vinyl | 85.2 | 83.5 | 84.2 | 83.9 | 84.2 | 83.5 |
| Syndiotacticity (%) | 71.8 | 72.0 | 72.5 | 71.9 | 73.0 | 72.3 |
| M$_w$ | 590,000 | 329,000 | 223,000 | 196,000 | 157,000 | 128,000 |
| M$_n$ | 284,686 | 168,000 | 113,000 | 98,000 | 79,000 | 66,000 |
| M$_w$/M$_n$ | 2.1 | 2.0 | 2.0 | 2.0 | 2.0 | 2.0 |

Although the invention has been described with reference to particular means, materials and embodiments it is to be understood that the invention is not limited to the particulars disclosed and extends to all equivalents within the scope of the claims.

We claim:

1. A method for forming a syndIotactic 1,2-polybutadiene product, comprising: polymerizing 1,3-butadiene in a hydrocarbon solvent, in the presence of catalytically effective amounts of:
   (a) an organomagnesium compound;
   (b) a chromium compound; and,
   (c) a dihydrocarbyl hydrogen phosphite, wherein the chromium compound is soluble in the hydrocarbon solvent.

2. The method of claim 1, wherein the organomagnesium compound is soluble in the hydrocarbon solvent.

3. The method of claim 1, wherein the syndiotactic 1,2-polybutadiene has a syndiotacticity of more than 66.5% and a melting temperature of more than 100° C.

4. The method of claim 1, wherein the syndiotactic 1,2-polybutadiene has a syndiotacticity of more than 70% and a melting temperature of more than 140° C.

5. The method of claim 1, wherein the polymerization of said method is conducted under agitation at a temperature of between about −10° C. to about 100° C. under an inert protective gas.

6. The method of claim 1, wherein the polymerization of said method is conducted in the presence of a molecular weight regulator.

7. The method of claim 1, wherein said organomagnesium compound is a dihydrocarbyl magnesium or a hydrocarbyl magnesium halide.

8. The method of claim 1, wherein said organomagnesium compound is represented by the formula MgR$_2$; wherein each R represents the same or different groups and is selected from the group consisting of alkyl, cycloalkyl, aryl, aralkyl, and allyl groups.

9. The method of claim 1, wherein said organomagnesium compound is represented by the formula RMgX; wherein R is selected from the group consisting of alkyl, cycloalkyl, aryl, aralkyl, and allyl; and, X is selected from the group consisting of fluorine, chlorine, bromine and iodine.

10. The method of claim 1, wherein said chromium compound is selected from the group consisting of: chromium 2-ethylhexanoate, chromium neodecanoate, chromium naphthenate, chromium stearate, chromium oleate, chromium benzoate, chromium tris(acetylacetonate), chromium tris(trifluoroacetylacetonate), chromium tris(hexafluoroacetylacetonate), chromium tris(benzoylacetonate), chromium tris(2,2,6,6-tetramethyl-3,5-heptanedionate), chromium ethoxide, chromium isopropoxide, chromium 2-ethylhexoxide, chromium phenoxide, chromium nonylphenoxide, chromium naphthoxide, tris(allyl)chromium, tris(methally)chromium, tris(crotyl)chromium, bis(cyclopentadienyl)chromium, bis(pentamethylcyclopentadienyl)chromium, bis(benzene)chromium, bis(ethylbenzene)chrornium, and bis(mesitylene)chromium.

11. The method of claim 1, wherein said dihydrocarbyl hydrogen phosphite is of the general tautomeric structures:

$$\underset{\text{H}}{\overset{\text{O}}{\|}}\text{P}\underset{\text{OR}^2}{\overset{\text{OR}^1}{<}} \rightleftharpoons \text{HO}-\text{P}\underset{\text{OR}^2}{\overset{\text{OR}^1}{<}}$$

wherein R$^1$ and R$^2$ are independently selected from the group consisting of: alkyl, cycloalkyl, aryl, aralkyl, and allyl groups.

12. A method for forming a syndiotactic 1,2-polybutadiene product, comprising: polymerizing 1,3-butadiene in a hydrocarbon solvent, in the presence of catalytically effective amounts of:
   (a) an organomagnesium compound;
   (b) a chromium compound selected from the group consisting of: chromium 2-ethylhexanoate, chromium neodecanoate, chromium naphthenate, chromium stearate, chromium oleate, chromium benzoate, chromium tris(acetylacetonate), chromium tris(trifluoroacetylacetonate), chromium tris(hexafluoroacetylacetonate), chromium tris(benzoylacetonate), chromium tris(2,2,6,6-tetramethyl-3,5-heptanedionate), chromium ethoxide, chromium isopropoxide, chromium 2-ethylhexoxide, chromium phenoxide, chromium nonylphenoxide, chromium naphthoxide, tris(allyl)chromium, tris(methally)chromium, tris(crotyl)chromium, bis(cyclopentadienyl)chromium, bis(pentamethylcyclopentadienyl)chromium, bis(benzene)chromium, bis(ethylbenzene)chromium, and bis(mesitylene)chromium; and,
   (c) a dihydrocarbyl hydrogen phosphite.

* * * * *